Patented Sept. 27, 1927.

1,643,437

UNITED STATES PATENT OFFICE.

NICHOLAS C. AMEN, OF KANSAS CITY, MISSOURI, ASSIGNOR TO HOWARD H. RANDOLPH, OF KANSAS CITY, MISSOURI.

FABRIC CEMENT.

No Drawing.  Application filed July 10, 1924. Serial No. 725,220.

This invention relates to a composition of matter to be used as a pliable and waterproof liquid cement for fabric or the like. I have found in practice that it is particularly efficient in repairing and manufacturing articles of canvas, closely woven cloth of linen or silk; and, in fact, wherever it is desired to join such material by means of an adhesive. It is also particularly advantageous in repairing tents and awnings.

My fabric cement consists essentially of nitrocellulose or nitro cotton or celluloid, benzol and methyl acetate. I also add, though not necessarily, a small per cent of butyl acetate or ethyl acetate which prevents blushing of the composition especially in damp, humid weather.

What I consider to be the best proportion of these different ingredients, but to which my invention is not to be limited, is the following:

| | Pounds. |
|---|---|
| Nitrocellulose or nitro cotton or celluloid | 4½ |
| Benzol (90% water white) | 11 |
| Methyl acetone | 9 |

If butyl acetate or ethyl acetate is used, I employ from 3 to 8 per cent of the above, according to the weather condition during the mixing. In damp humid weather, the solution will blush, either of the two acetates can be used to check blushing by adding from 3 to 8 per cent.

I have found that as a base and adhesive power, either nitrocellulose or nitro cotton or celluloid is most desirable. The benzol, used in the ratio mentioned above, adds its oily properties to prevent the cement from eating the container, and also proves valuable in rendering the cement pliable after it has dried.

The methyl acetone functions as the solvent and, when mixed with the benzol in the proportions given, reduces, the drying time of the cement to a minimum.

The steps or process of mixing the fabric cement essentially includes the following:

Benzol and methyl acetone are first thoroughly mixed together, after which the nitrocellulose is added. The solution should be stirred constantly from the very beginning of the mix.

A constant and uninterrupted mixing of from three to eight hours is required to insure a thoroughly mixed solution, after which it is allowed to age for approximately 48 hours. This aging permits all foreign matter to settle before placing the finished product in containers.

I have found in practice that my fabric cement is more satisfactory for use in connection with tents and awnings than any other obtainable. It is waterproof, impervious to practically all acids; is pliable and dries rapidly, all of which is a material advantage wherever the cement is employed.

When I refer to the various ingredients, I refer to the well-known articles of trade.

Having thus described this invention, the details of which I do not desire to be limited, what is claimed as new and what it is desired to secure by Letters Patent is set forth in the appended claims:

1. A fabric cement consisting of 18% nitrocellulose, 45% benzol, 37% methyl acetone and a small amount of butyl acetate.

2. A fabric cement consisting of 11 pounds of benzol, 9 pounds of methyl acetone, 4½ pounds of nitrocellulose and from ¼ to 2 pounds of butyl acetate.

NICHOLAS C. AMEN.